United States Patent Office 3,558,427
Patented Jan. 26, 1971

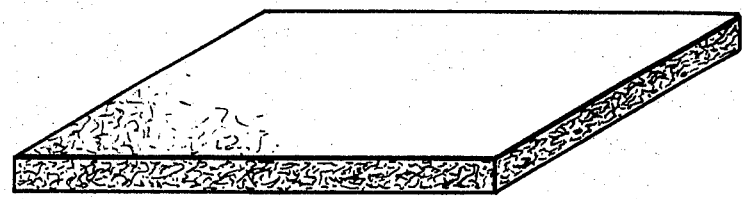
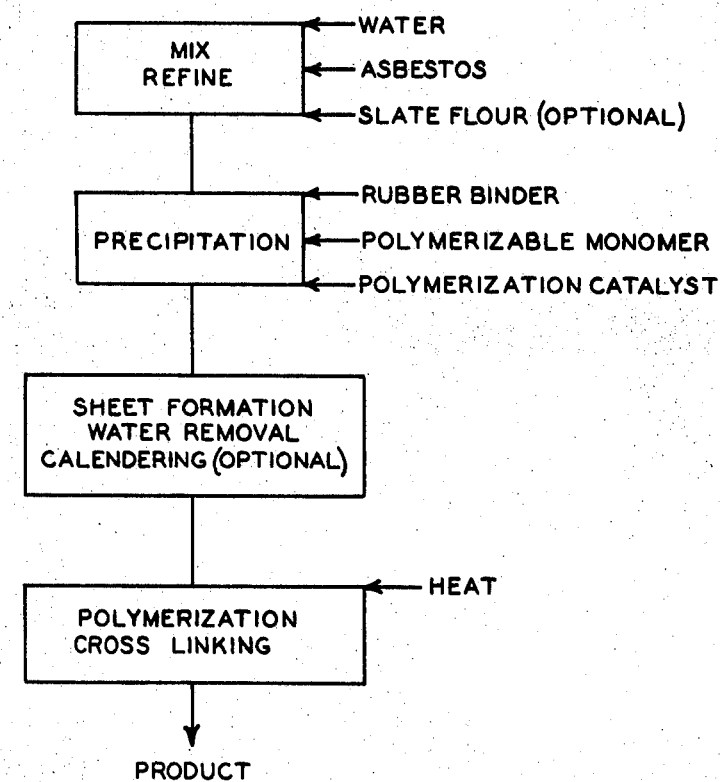

3,558,427
ASBESTOS SHEET MATERIAL AND PROCESS FOR MANUFACTURE
John W. Baymiller, Lancaster, Pa., assignor to Armstrong Cork Company, Lancaster, Pa., a corporation of Pennsylvania
Filed June 19, 1968, Ser. No. 738,256
Int. Cl. D21h 5/18
U.S. Cl. 162—155
8 Claims

ABSTRACT OF THE DISCLOSURE

A beater saturation process wherein a rubber binder is deposited on asbestos fibers in an aqueous slurry. To the asbestos fiber-rubber binder slurry is added from 2–25% by weight, based on the weight of the fibers, of a polymerizable monomer having at least two olefinically unsaturated bonds in the monomer molecule and from 1½–10% by weight, based on the weight of the polymerizable monomer, of a polymerization catalyst. After the sheet has been formed, the polymerizable monomer is polymerized by subjecting the formed sheet to sufficient heat to bring about the polymerization. A tough strong sheet results.

BACKGROUND OF THE INVENTION

Field of the invention

The invention relates generally to beater saturation processes wherein polymerizable materials are deposited on fibers along with the normal binders.

DESCRIPTION OF THE PRIOR ARTS

Beater saturated asbestos sheet materials are old in the art as exemplified by U.S. Pat. No. 2,759,813, among others. Rubber binders can be deposited upon asbestos fibers in an aqueous slurry in a wide variety of ways. Sheets are formed from such slurries by forming the sheets on fourdrinier wires, cylinder machines, or any other suitable method of water removal. Subsequent heating to drive off remaining water and subsequent calendering steps are common in order to produce sheets having uses in the gasketing or surface covering fields.

U.S. Pat. No. 3,223,676 teaches the formation of a gasketing material by dry blending in a suitable mixer polytetrafluoroethylene with a butadiene-acrylonitrile rubber, a filler which may be asbestos, polyethylene glycol dimethacrylate along with a dicumyl peroxide catalyst. Such processes to do not possess the simplicity, the uniformity of binder distribution, and the speed of beater saturation processes.

SUMMARY OF THE INVENTION

In a beater saturation process comprising depositing a rubber binder onto asbestos fibers in an aqueous slurry, followed by sheet formation, the improvement which comprises distributing throughout the rubber binder (1) a polymerizable monomer having at least two olefinically unsaturated sites in the molecule, and (2) a polymerization catalyst. The binder-monomer-catalyst mixture is deposited on the asbestos fibers by any suitable beater saturation process, followed by the usual sheet formation steps. The resulting sheet is finally heated to a temperature sufficiently high that the polymerization catalyst initiates polymerization and crosslinking of the polymerizable monomer. The resulting sheet is sufficiently strong and stable that it may be used as head gaskets for automobile engines, a most stringent use.

BRIEF DESCRIPTION OF THE DRAWING

FIG. 1 represents a simplified cross-sectional view of a product of the present invention, and FIG. 2 is a simplified flow diagram of the process of the present invention.

The legends on both figures are self-explanatory.

DESCRIPTION OF THE PREFERRED EMBODIMENTS

An asbestos slurry is formed in water in the usual manner by mixing asbestos fibers in water to the desired consistency, usually in the range of about 0.5–3% with 1% the preferred consistency. The slurry may be mechanically refined or otherwise treated as desired in the normal manner. The asbestos will usually be chrysotile asbestos, although crocidolite fibers or mixtures of chrysotile and crocidolite may be used.

Any of the usual rubber binders will be added to the slurry in order to coat the fibers in the slurry. The SRB rubbers may be used, these being copolymers of butadiene and styrene containing usually 50%–70% butadiene. Where the product of the present invention is to be used as an automotive head gasket, it is preferred that the binder be copolymers of butadiene and acrylonitrile, the so-called NBR rubbers. Polychroloprene, polymers of 2-chlorobutadiene-1,3 may be used. These are commonly referred to as neoprenes. If desired, homopolymers of butadiene may be employed as well as homopolymers or copolymers of homologues such as isoprene.

These synthetic rubbers are normally added to the slurry in the form of a latex, with or without pretreatment of the asbestos fibers, in order to bring about deposition of the solids content of the latex onto the fibers. The crux of the present invention is to establish a mixture of such rubber binders with a polymerizable monomer containing at least two olefinically unsaturated sites in its molecule. A polymerization catalyst for bringing about polymerization at elevated temperatures of the monomer is also included. The most convenient manner for incorporating both the polymerizable monomer and its catalyst into the binder is simply to add an emulsion, suspension, or other convenient form of the monomer and catalyst.

The amount of rubber binder to use will generally vary from about 10% to about 50% by weight based on the weight of the fibers. The amount of polymerizable monomer to be added to the rubber binder in the form of its latex will generally be in the amount of 2% to 25% by weight based on the weight of the fibers. The amount of catalyst will be that customarily used to cause polymerization of polymerizable monomers, and normally would be about 1½% to 10% by weight of the polymerizable monomer.

The polymerizable monomer and the catalyst may simply be added to the latex with sufficient agitation to distribute the monomer and the catalyst throughout the latex. The latex may then be added to the asbestos slurry under any of the conditions which normally produce controlled deposition of the rubber content of the latex onto the asbestos fibers. Precipitation and deposition of the rubber content of the latex along with the polymerizable monomer and its catalyst are usually complete within about 30 to 40 minutes, and many of the beater saturation processes bring about suitable precipitation in a much shorter period of time. The resulting sheet may be improved by the addition of such finely ground mineral additives as slate flour. Such additives increase the density of the finished sheet and may render the sheet even less extrudable under the conditions of operation as a head gasket for automotive engines. Such additives may be placed in the slurry at any convenient time during the processing of the asbestos fibers.

When the sheet has been formed on conventional paper-making equipment, the sheet may be dried over the usual heating rolls to reduce the water content to that desired, normally a couple of percentage points by weight, provided the polymerizable monomer is not distilled off. Room temperature drying may be desirable when the more volatile monomers are used.

In order to toughen the binder and to produce an exceedingly strong sheet, the polymerizable monomer must be made to polymerize by subjecting the sheet to sufficient heat to bring about such polymerization. The polymerization temperature in the presence of the catalyst will depend upon the particular polymerizable monomer and catalyst present. Where the sheet is to be used as a head gasket in automotive engines, it is preferred that the polymerizing temperature be in the range 300°–400° F. At higher temperatures within this range, shorter periods of heating would be used in order to prevent charring or decompositoin of the rubber binder. The heating may be conveniently carried out in a press in which a press cure cycle can be established to produce a good density and a good cure by a combination of polymerization and crosslinking of the polymerizable monomer. Polymerization may also be carried out by immersion of the sheet in a salt bath maintained at a suitable temperature for polymerization, preceded by calendering or rotopressing, if desired. In fact, salt bath cure has been been found to be relatively inexpensive with a good cure at high density being obtainable in a minute or two at a convenient temperature.

The monomer to be added must have at least two olefinically unsaturated sites in its molecule. Not only does the monomer polymerize under the conditions of heating described above, but it also causes crosslinking of the rubber binder. Since it is postulated that crosslinking occurs to a significant extent during the present process, it is necessary that polymerizable monomers have more than one polymerizing site. Examples of usable polymerizable monomers are the di- and tri-acrylates and dimethacrylates prepared by the esterification of glycols with acrylic acid and methacrylic acid. Monoacrylates and methacrylates are usable where the esterifying portion of the alcohol itself contains an olefinically unsaturated bond, as is the case in allylacrylates. Dicarboxylic acids may be esterified with unsaturated alcohols to produce such usable monnomers as diallylfumarate. Di-olefinically unsaturated hydrocarbons such as divinylbenzene, divinyltoluene, and the like also function to polymerize and a crosslink in the present process. As used herein, the term monomer means a compound of relatively low molecular weight compared with the polymers it forms.

The catalysts to be used to bring about polymerization of the polymerizable monomer are the known free radical catalysts widely used to enhance polymerization of olefinically unsaturated compounds. They comprise primarily the organic per-compounds. Among the peroxides that are usable are di-t-butyl peroxide, benzoyl peroxide, lauroyl peroxide, caproyl peroxide, acetyl peroxide, p-chloro-benzoyl peroxide, cumene hydro-peroxide, and the other known peroxide initiators. Large numbers of such peroxides exist and generally they are broken down into broad groups comprising low temperature types, intermediate types, and high temperature types. The high temperature types are those generally used above 212° F. and are preferred in the present invention. Other per-compounds such as t-butyl perbenzoate, and isopropylpercarbonate are usable in the present process. Besides are per-compound type of free-radical initiators, there may be used such aliphatic azocatalysts such as alpha, alpha'-azodiisobutyronitrile.

The following examples illustrate several embodiments of the invention. All parts are by weight unless otherwise stated.

Example 1

The following three formulationse were prepared:

| Ingredients | I | II | III |
|---|---|---|---|
| Asbestos | 100 | 100 | 75 |
| Slate flour | | | 25 |
| Butadiene-acrylonitrile copolymer, 40% acrylonitrile | 40 | 33⅓ | 33⅓ |
| Dicumyl peroxide, 40% | 0.6 | 0.6 | 0.6 |
| Trimethylolpropane trimethacrylate | | 6⅔ | 6⅔ |
| Density from calendering, lbs./ft.³ | 90 | 97 | 103 |
| Creep-relaxation after cure, percent | 15 | 12 | 12 |

All formulations were made by slurrying the asbestos and catalyst, dicumyl peroxide, in water followed by a single pass through a Jordan refiner. Slate flour, if any, was then added with agitation. The system had a consistency of 1.9%. The butadiene-acrylonitrile copolymer latex was then added to the slurry. To shorten precipitation times, a water solution of magnesium sulfate and a wetting agent were added to the asbestos slurry prior to the addition of the latex. In the runs where the polymerizable monomer was used (Formulas II and III) the monomer was distributed throughout the latex prior to the addition of the latext to the slurry.

In Formula I, the product without the polymerizable monomer was cured in a press for 15 minutes at 335° F. at 1,750 pounds per square inch. In Formula II, with the polymerizable monomer present, press cure time was maintained under the same conditions except the time was reduced from 15 minutes to 7½ minutes. In Formula III, the sheet was first calendered before cure to a density of 103 pounds per cubic foot. Note the improvement in density by calendering before cure in Formulas II and III. The calendered sheet was then immersed in a salt bath for one to two minutes at 375° F. The density in Formula III remained at 103 pounds per cubic foot, and the gauge and density uniformity were superior to those achieved with Formulas I and II.

Example 2

A series of five runs were made using Formula III except for a change in catalyst or monomer or both. Cure was carried out in a press at 1750 p.s.i. for 15 minutes at 335° F. Monomer amounts are based on the weight of the rubber binder, and catalyst amounts are based on the weight of the monomer. Following are the data:

| | Polymerizable monomer amount, percent | Catalyst amount, percent | Density, p.s.i. | Creep relaxation |
|---|---|---|---|---|
| Formula No.: | | | | |
| IV | Trimethylolpropane trimethacrylate, 20 | Benzoyl peroxide, 1½ | 108.3 | 6.2 |
| V | do | Lauroyl peroxide, 3 | 110.1 | 6.7 |
| VI | Ethylene glycol dimethacrylate, 20 | Dicumyl peroxide, 1½ | 105.2 | 15.1 |
| VII | Polyethylene glycol dimethacrylate, 20 | do | 109.4 | 12.2 |
| VIII | 1,3-butylene glycol dimethacrylate, 20 | do | 107.8 | 2.0 |

Example 3

A run was made in which the rubber binder was an SBR containing 50% by weight styrene. Precipitation on the asbestos fibers was accomplished by addition of magnesium sulfate to the slurry. A small amount of the antioxidant dibetanaphthyl paraphenylene diamine was added to the slurry.

Following is the formula.

Ingredients: Parts
    Asbestos _____ 85
    Carbon black _____ 3.4
    SBR (dry weight) _____ 25.5
    Dicumyl peroxide _____ 0.51
    Trimethylolpropane trimethacrylate _____ 5.7

Consistency of the slurry was 1.9%. Press cure was carried out for 15 minutes at 370° F. at 1750 p.s.i. Density was 107.2 p.c.f., and creep relaxation was 8.8%.

This run was repeated using a binder of polymeric mixed acrylic esters, and the resulting sheet had a creep relaxation of 13.3%. Without use of the catalyst and monomer, the sheet had a creep relaxation of 30.4%.

I claim:

1. In a beater saturation process comprising forming a slurry having a consistency range of from 0.5% to 3% by weight of asbestos fibers in water, depositing a rubber binder on said fibers, and forming a bonded sheet from the resulting fibers, the improvement which comprises distributing through said binder a polymerizable composition consisting essentially of:
   (1) a polymerizable monomer in the amount of from 2% to 25% by weight, based on the weight of the fibers, and having at least two olefinically unsaturated bonds in the monomer molecule, and
   (2) a polymerization catalyst for said polymerizable monomer in the amount of from 1½% to 10% by weight of the polymerizable monomer,
depositing the mixture of said binder and said polymerizable composition on said fibers, forming a sheet from the resulting slurry, and heating the sheet to a temperature sufficient to cause polymerization of said polymerizable monomer.

2. A process according to claim 1 wherein said polymerizable monomer is trimethylolpropane trimethylacrylate.

3. A process according to claim 1, including the additional step of distributing slate flour throughout said slurry of asbestos fibers.

4. A process according to claim 1 wherein said polymerization catalyst is a peroxide.

5. A process according to claim 1, including the additional step of pressing the sheet during the heating thereof.

6. A process according to claim 1 wherein said heating step comprises immersing said sheet in a salt bath.

7. A process according to claim 1, including the additional step of calendering the sheet prior to said heating step.

8. The product of the process of claim 1.

References Cited

UNITED STATES PATENTS

| | | | |
|---|---|---|---|
| 2,596,162 | 5/1952 | Muskat | 161—170 |
| 2,940,893 | 6/1960 | Feigley, et al. | 162—155 |
| 3,223,676 | 12/1965 | Rucker | 260—828X |
| 3,232,824 | 2/1966 | Bader | 162—183X |

S. LEON BASHORE, Primary Examiner

A. A. D'ANDREA, JR., Assistant Examiner

U.S. Cl. X.R.

162—168, 185